United States Patent
Bell et al.

(10) Patent No.: US 6,676,059 B1
(45) Date of Patent: Jan. 13, 2004

(54) SEAT BELT RETRACTOR

(75) Inventors: John Bell, Carlisle (GB); Martyn Neil Palliser, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/290,398

(22) Filed: Nov. 8, 2002

(30) Foreign Application Priority Data

Apr. 16, 2002 (GB) .............................................. 0208698

(51) Int. Cl.[7] .............................................. B65H 51/20
(52) U.S. Cl. ................................................... 242/379.1
(58) Field of Search ....................... 242/379.1; 280/805, 280/806; 297/470, 471, 472

(56) References Cited

U.S. PATENT DOCUMENTS

| | | | |
|---|---|---|---|
| 5,014,927 A | 5/1991 | Ogawa et al. | |
| 6,216,972 B1 * | 4/2001 | Rohrle | 242/379.1 |
| 6,250,579 B1 | 6/2001 | Bannert et al. | 242/379.1 |
| 6,416,006 B1 * | 7/2002 | Huber | 242/379.1 |

FOREIGN PATENT DOCUMENTS

| | | |
|---|---|---|
| DE | 10117789 | 10/2001 |
| EP | 1149743 | 4/2001 |
| EP | 1180457 | 8/2001 |
| JP | 2001-301563 | 10/2001 |

* cited by examiner

*Primary Examiner*—John M. Jillions
(74) *Attorney, Agent, or Firm*—Lonnie Drayer

(57) ABSTRACT

A seat belt retractor has a spool mounted for rotation on the retractor frame, for retraction or pay-out of seat belt webbing depending upon the rotation direction of the spool. The spool is locked against rotation when a crash is sensed. A force limiting mechanism allows further pay-out of the seat belt webbing after the spool shaft has locked, under the influence of a vehicle occupant's forward momentum. The force limiting means includes a torsion bar attached in the force path between the spool and its axis of rotation; and a resilient mechanism. A mechanism selectively connects the resilient mechanism into the force path between the spool and its axis of rotation. A selecting mechanism selectively activates the connecting means in response to a control signal.

16 Claims, 8 Drawing Sheets

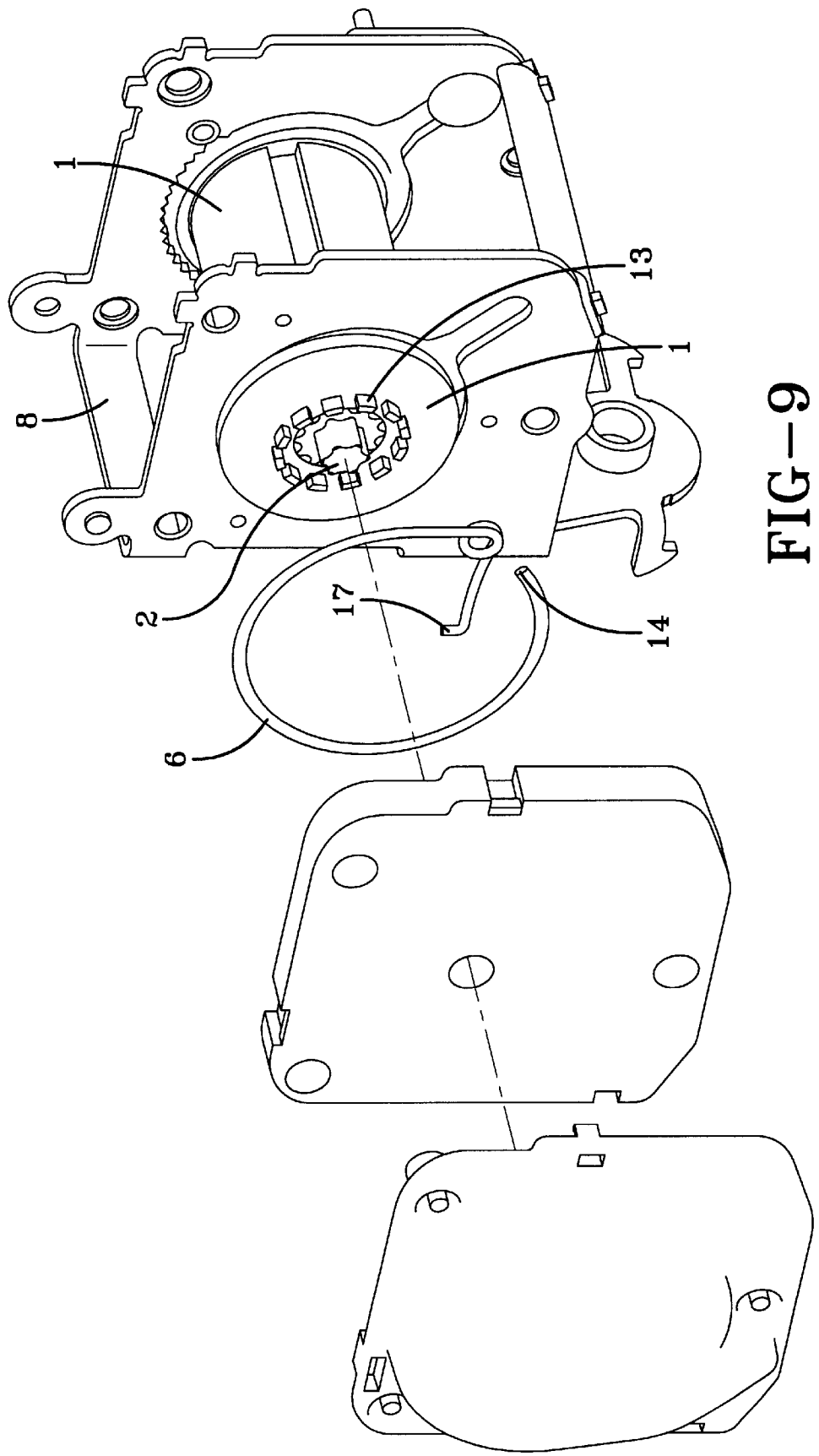

SEAT BELT RETRACTOR

FIELD OF THE INVENTION

The present invention relates to a seat belt retractor.

BACKGROUND OF THE INVENTION

A seat belt retractor generally comprises a cylindrical bobbin or spool with a circular cross-section. Seat belt webbing is attached to and wound around the spool and the spool is mounted on a spool shaft in the seat belt retractor. The spool is rotatable to wind in webbing under action of a retractor spring and to pay out webbing under the influence of relatively gentle forwardly directed movement of a vehicle occupant, for example to allow for normal movement associated with vehicle occupancy such as reaching forwards to activate controls for a radio or a window, or to reach a glove compartment or door pocket. In a crash, the more extreme momentum of the vehicle occupant activates a crash sensor which locks the spool against rotation and thus prevents forward motion of the vehicle occupant.

The sudden locking of the seat belt spool in a crash can itself sometimes cause injury to the vehicle occupant due to sudden impact of the torso with the belt webbing. This is particularly true in severe crashes. In recent years this problem has been recognized and some solutions proposed.

One solution has been to rely on natural elongation of the webbing under high loads, and on the spool film effect caused by natural tightening of the webbing wound on the spool under high loads, to produce a load limiting effect.

Another proposal has been disclosed in U.S. Pat. No. 5,014,927, wherein force limiting is effected by interposing a plastically or electrically deformable member in the force path, for example between the spool and the innermost winding of the belt webbing. One common example is a torsion bar made of steel which twists when high torque is applied and which can rotate up to seven or eight times while remaining intact. The pay-out of webbing is generally in proportion to the momentum of the vehicle occupant at the moment a crash is sensed. This pay-out lessens the otherwise severe restraining forces on the vehicle occupant at high vehicle speeds, especially during the initial moments of the crash. It thus reduces the injurious effects of the seat belt in a crash.

However there is currently no straightforward way to adjust a torsion bar load limited seat belt retractor for different vehicle occupants. The weight and size of a vehicle occupant and the severity of the crash affects the performance of torsion bar load limiters and it would be preferable to adjust the load limiting to suit the vehicle occupant more closely.

SUMMARY OF THE INVENTION

There is provided in accordance with the present invention a seat belt retractor comprising: a spool mounted for rotation on a retractor frame for retraction or pay-out of seat belt webbing depending upon the direction of rotation of the spool; a means for locking the spool against rotation when a crash is sensed; a force limiting means for allowing further pay-out of the seat belt webbing after the spool shaft has locked, under the influence of a vehicle occupant's forward momentum, wherein the force limiting means comprises: (a) a torsion bar attached in the force path between the spool and its axis of rotation; (b) a resilient mechanism, and means for selectively connecting the resilient mechanism into the force path between the spool and its axis of rotation; and (c) a means for selectively activating the connecting means under control of a control signal.

BRIEF DESCRIPTION OF THE DRAWINGS

FIG. 9 is an exploded isometric view of a second embodiment of a seat belt retractor according to another embodiment of the present invention.

DETAILED DESCRIPTION OF THE INVENTION

Figure 1:
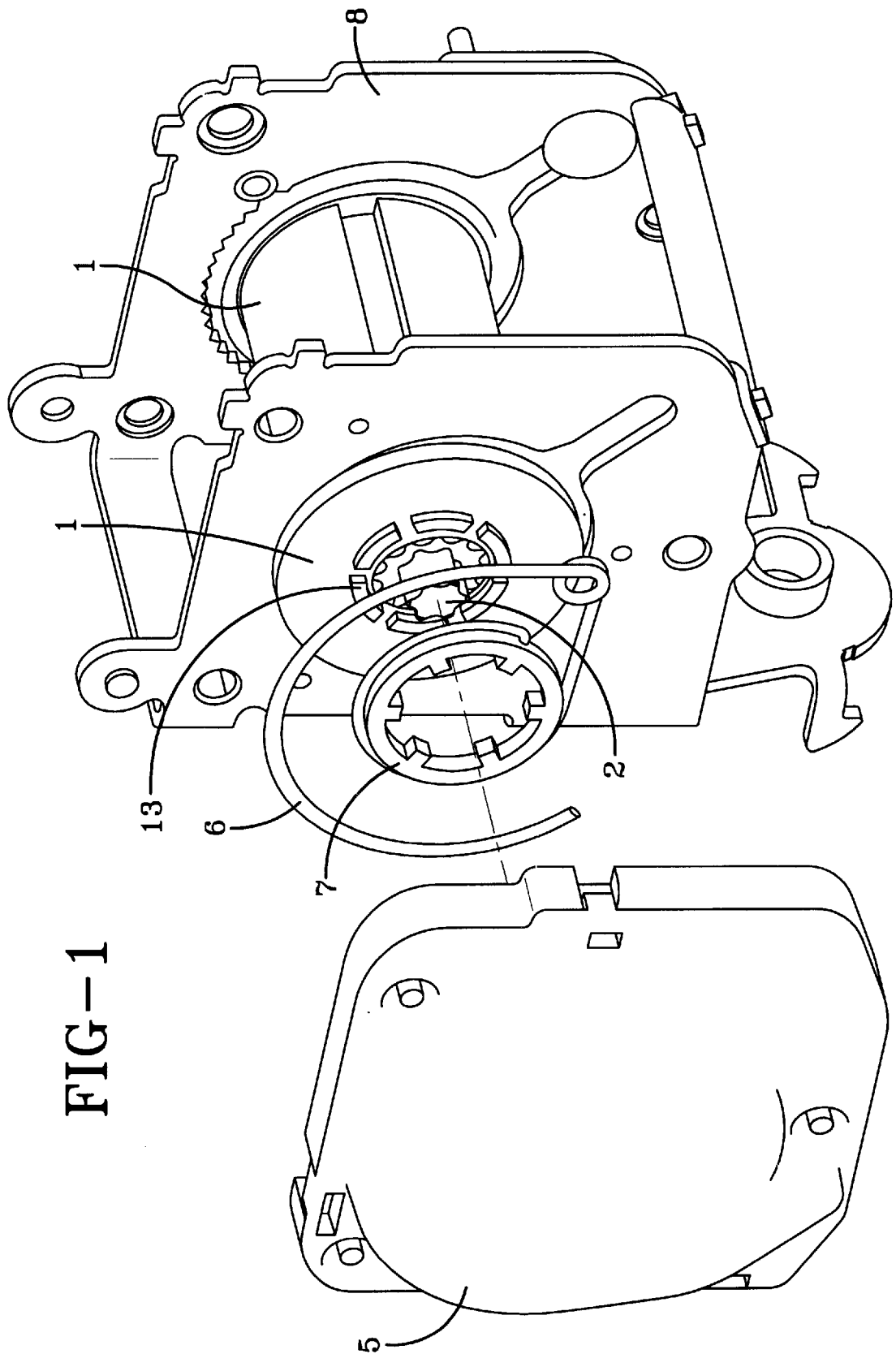
FIG. 1 is an exploded isometric view of a first embodiment of a seat belt retractor according to one embodiment of the present invention.
Figure 2:
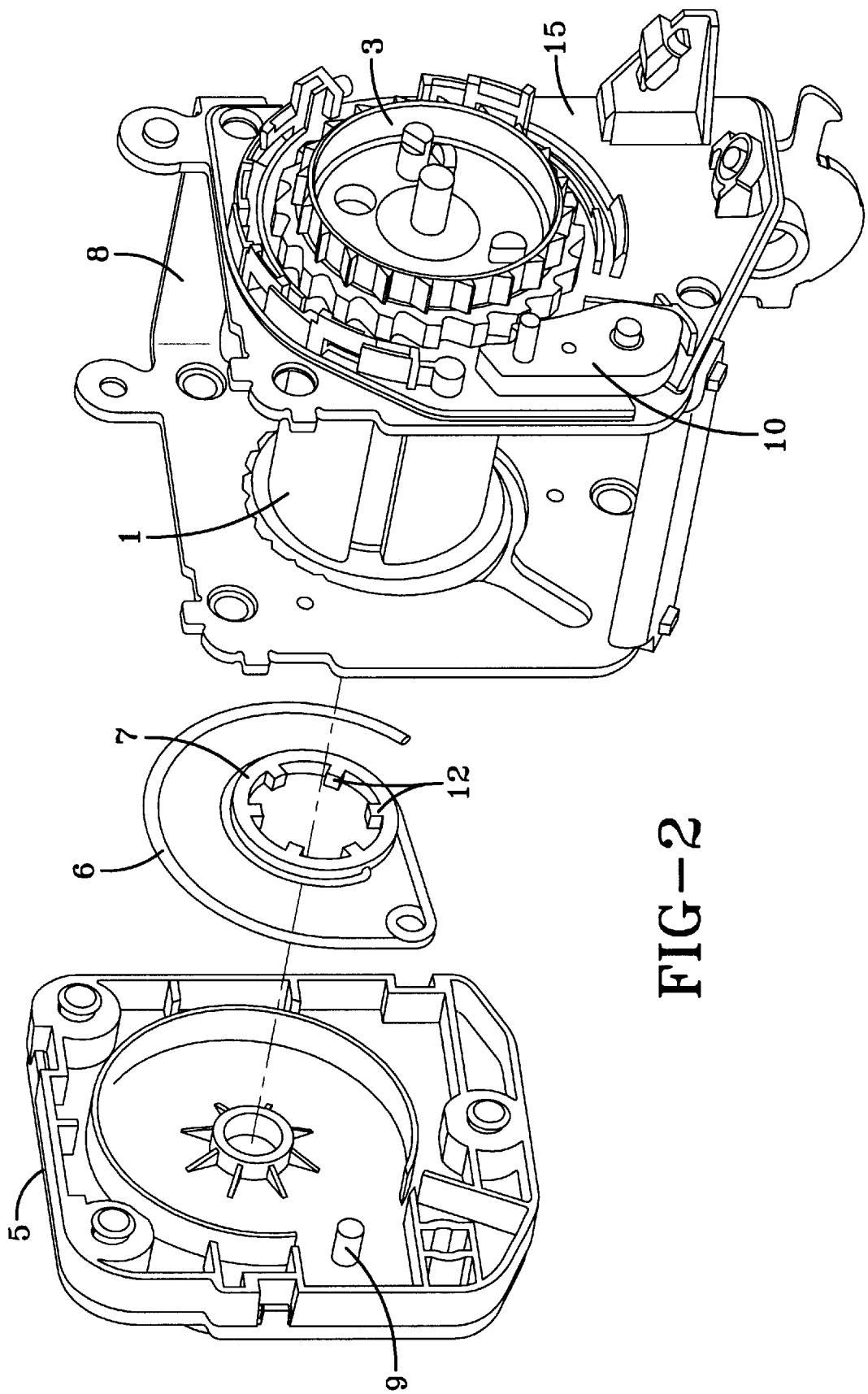
FIG. 2 is an exploded isometric view of the seat belt retractor of FIG. 1 viewed from the opposite side.

FIGS. 1 and 2 show a cylindrical retractor spool 1 with a load limiting torsion bar 2 which is mounted along the spool axis and is fixed at one end of the spool 1 to a locking ring 3 attached to multifunction piece 15, as best shown in FIG. 2. The spool 1 is mounted for rotation in a frame 8. According to one embodiment of the invention the torsion bar has two ends each connected to respective halves of a split spool. A first half of the spool comprises a locking ring and is fixed against rotation during load limiting. The second half, i.e. the spool body, rotates to twist the torsion bar at a particular load limiting load.

In a crash a sensor activates a locking mechanism comprising lock bar 10 which engages teeth on the outside of the locking ring 3 to prevent rotation of the spool and begin the spool locking process. The other end of the torsion bar 2 is connected to the spool 1 as shown in FIG. 1. On this side of the seat belt retractor a rewind spring assembly 5 is attached to the spool 1. The rewind spring assembly 5 comprises a clock type coiled spring which biases the spool to a webbing rewound condition.

When a crash is sensed the lockbar 10 engages the teeth on the locking wheel 3, and subject to further movement due to twisting of the torsion bar 2, locks the spool 1 against further rotation. If the crash forces are large the force on the torsion bar 2 will cause it to twist and the spool 1 will rotate under conditions controlled by the properties of the torsion bar. Usually the spool rotates up to another two turns and thus the torsion bar 2 twists by two turns before the crash forces have dissipated. A typical torsion bar can twist up to five to six turns before it breaks.

According to the present invention a secondary load limiting mechanism 6 is selectively attachable to the spring end of the spool 1 and torsion bar 2 by a yoke 7 activated by an activating mechanism (not shown) such as a solenoid or pyrotechnic device. This secondary load limiting mechanism 6 comprises a wire bent around a fixed post 9 in the spring mechanism assembly 5, and coiled around the yoke 7. The activating mechanism is activated when the threshold for load limiting is required to be raised, for example for a heavier or larger than normal vehicle occupant. A control signal may be supplied by an electronic control unit in response to a means for sensing a value of at least one of the weight and size of the vehicle occupant and activating the activating mechanism if the sensed value exceeds a predetermined value. Alternatively the control signal may be supplied by the vehicle occupant manually entering a signal indicative of his weight and/or size exceeding the predetermined value.

The coiled wire 6 winds around the end of the torsion bar or spool body to apply extra load to combine with the torsion bar load. The extra load is dependent upon the energy required to extract the wire around a set post and this can be tailored to suit a vehicle's crash criteria by customizing the thickness, length and composition of the wire or number of wires. The wire is be selectively connectable to the torsion bar by for example a solenoid or a pyrotechnic device activated by a signal from an electronic control unit, which may be a central processing unit for the vehicle.

The wire is 6 typically arranged to be energy absorbing to the extent of approximately 1.5 to 3 KN. It might be made of spring wire and have a thickness of around 1.5 mm.

Figure 4:
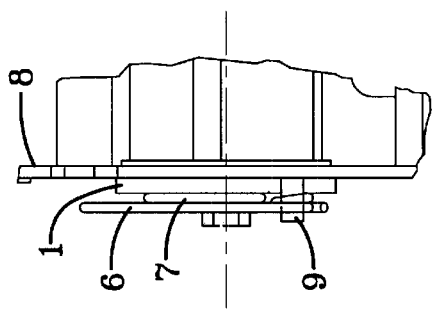
FIGS. 3 and 4 are cross-sectional; side views of part of the seat belt retractor of FIGS. 1 and 2.
Figure 6:
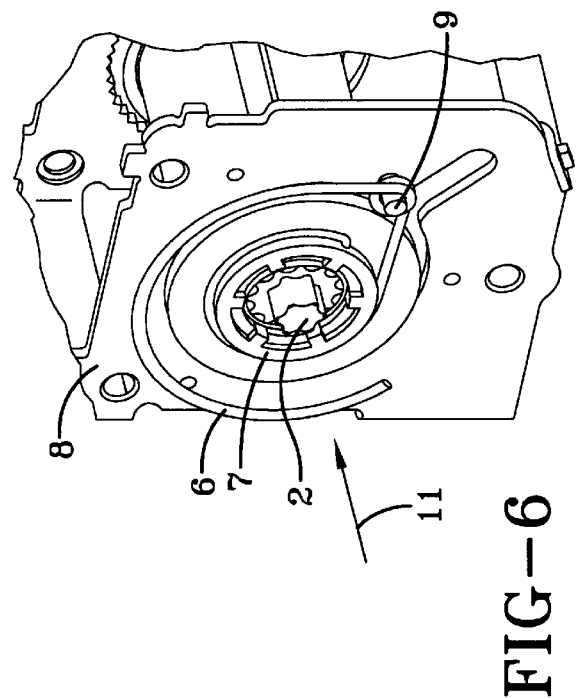
FIGS. 5 and 6 are fragmentary isometric side views of part of the seat belt retractor of FIGS. 1 and 2.
Figure 3:
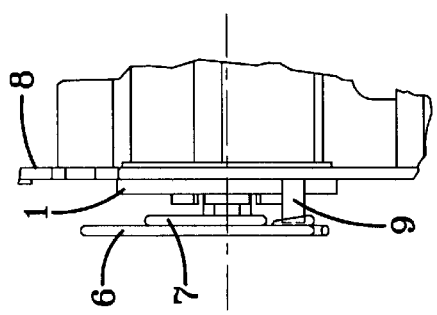
Figure 5:
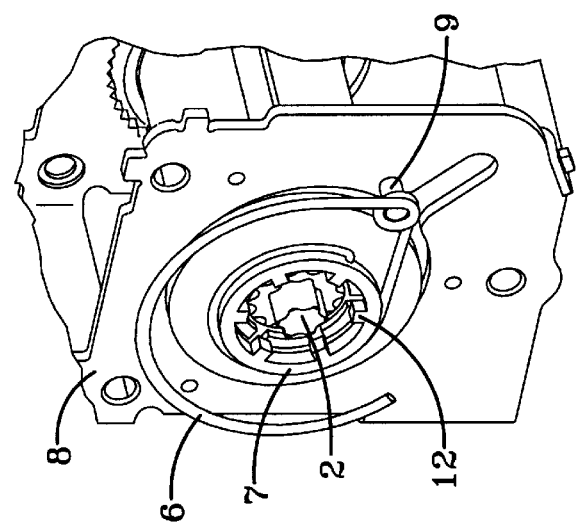
Figure 8:
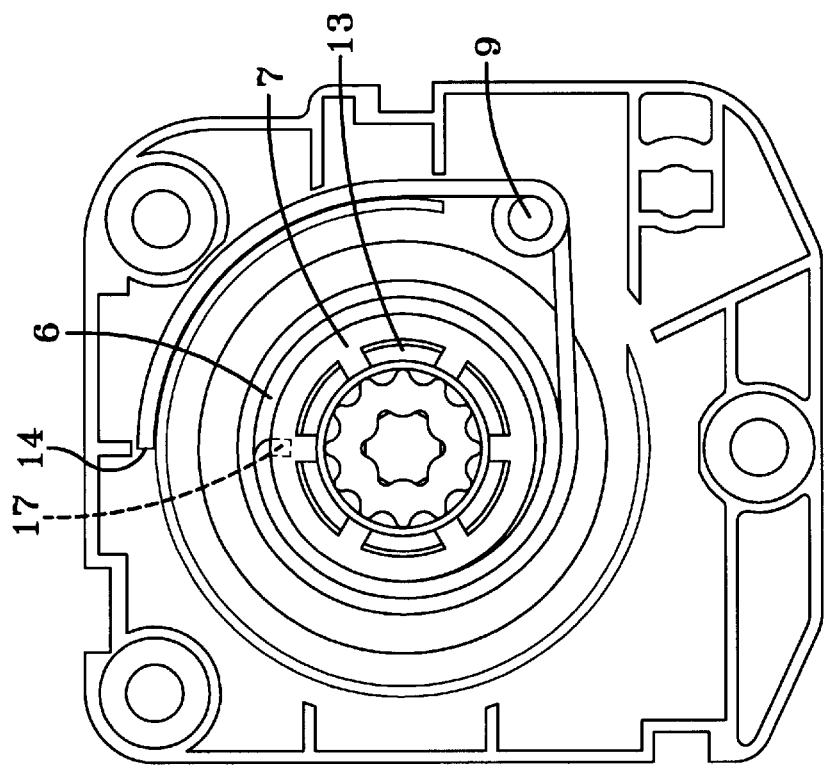
FIGS. 7 and 8 are end views of the seat belt retractor of FIG. 1.
Figure 7:
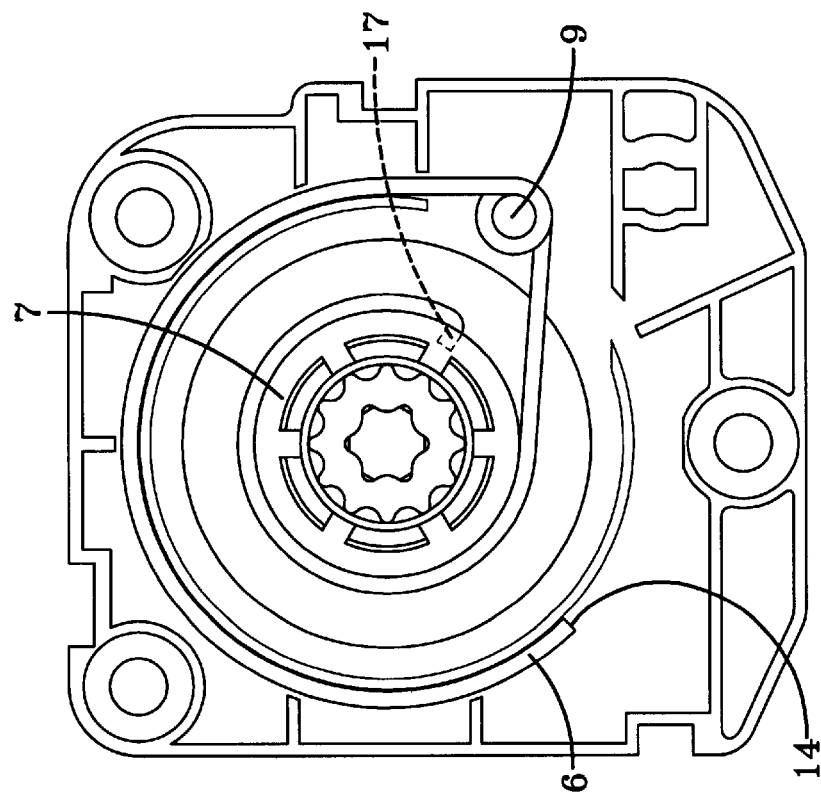
Figure 10:
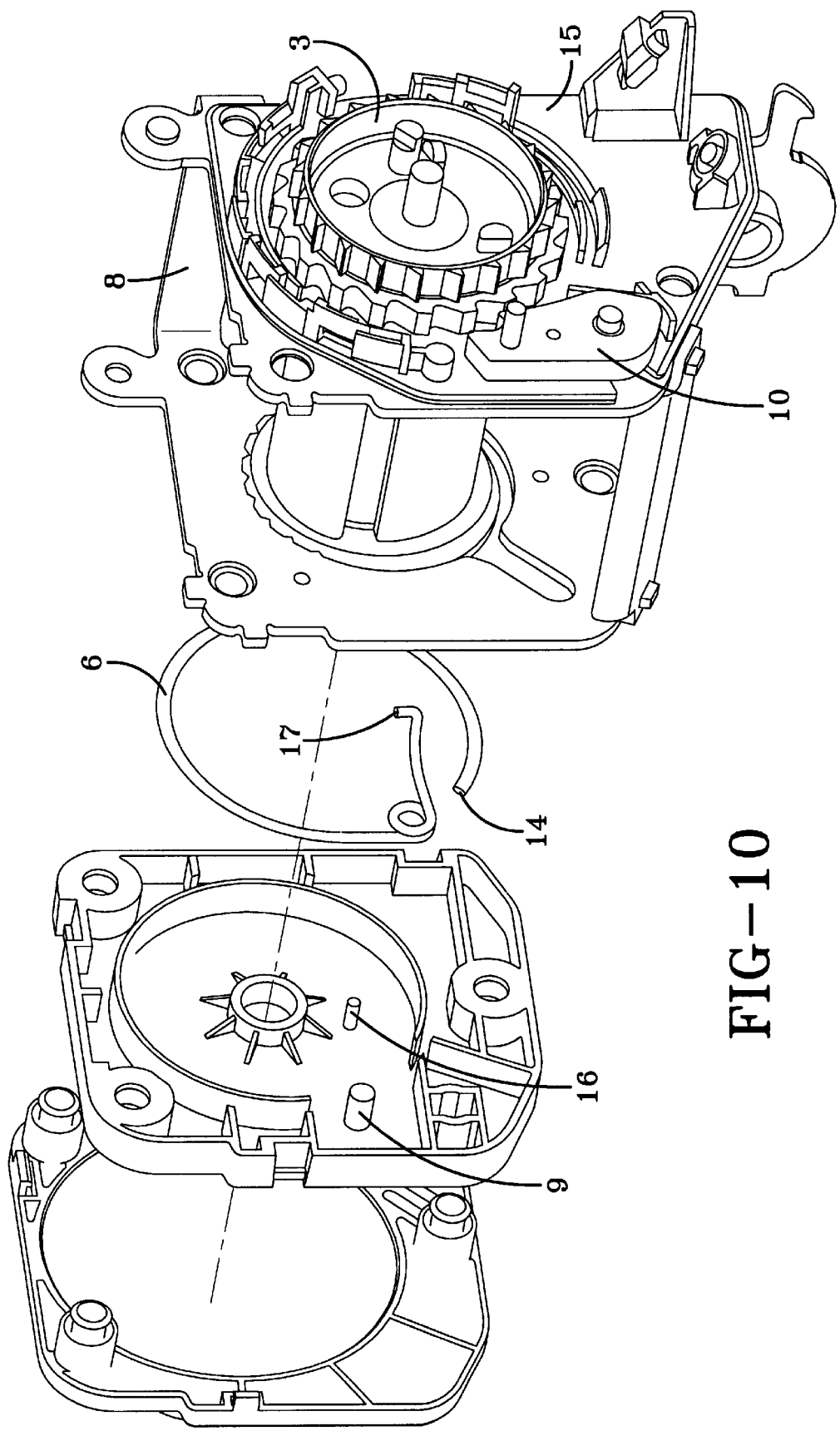
FIG. 10 is an exploded isometric view of the seat belt retractor of FIG. 9 viewed from the other end.

The arrangement before engagement of the yoke 7 with the spool 1 and torsion bar 2 is shown in FIGS. 3 and 5 where is can be seen that the yoke 7 is spaced apart from the spool. On activation of the activating mechanism, for a heavier vehicle occupant, the yoke is moved in the direction indicated by arrow 11 so that the inwardly pointing crenellations 12 on the yoke engage correspondingly sized cut-outs in a raised ring 13 on the end face of the spool 1, as best shown in FIG. 1. This is the engaged position shown in FIGS. 4 and 6 at which stage the threshold for rotation of the spool has been raised. Further rotation of the spool, as the torsion bar 2 twists, will turn the yoke 7 and draw the wire 6 further around the yoke 7 via the peg 9. This is illustrated in FIGS. 7 and 8. In FIG. 7 the yoke 7 has just engaged the spool 1. In FIG. 8 the spool has rotated about two-thirds of a turn, winding the wire 6 further around the yoke 7 via the bar 9 and drawing the end 14 of wire 6 about two-thirds of a turn clockwise.

Figure 11:
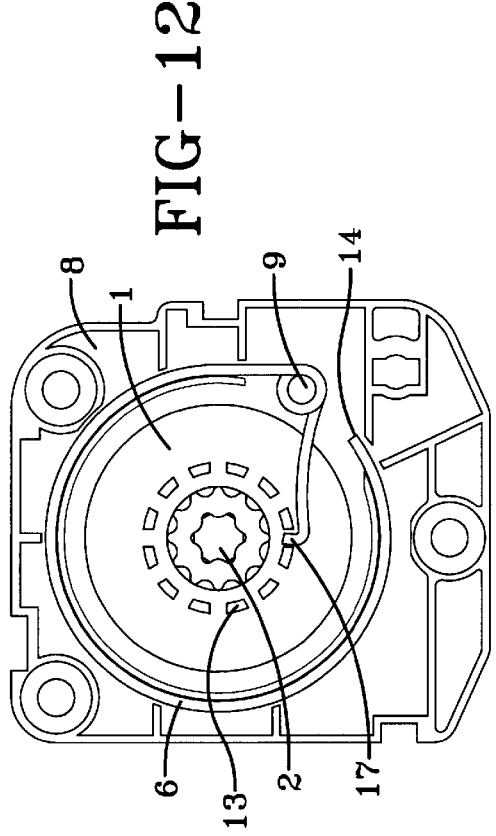
FIGS. 11 to 14 are end views of the seat belt retractor of FIGS. 9 and 10 showing its operation in sequence.
Figure 12:
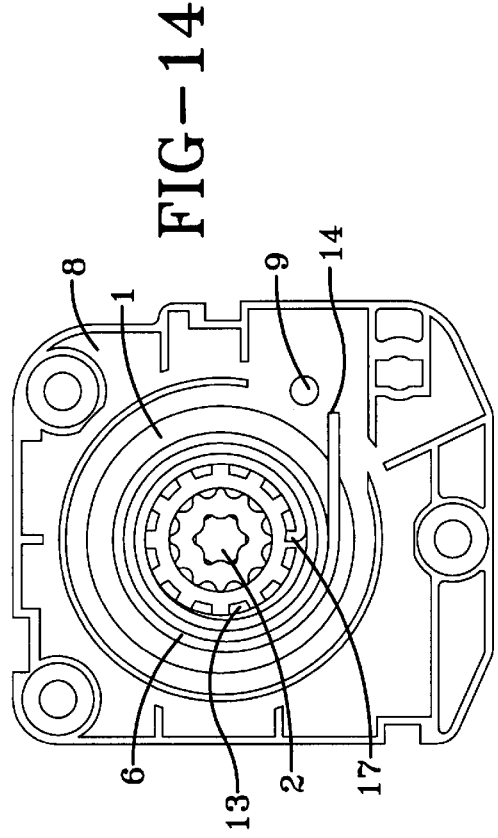
Figure 13:
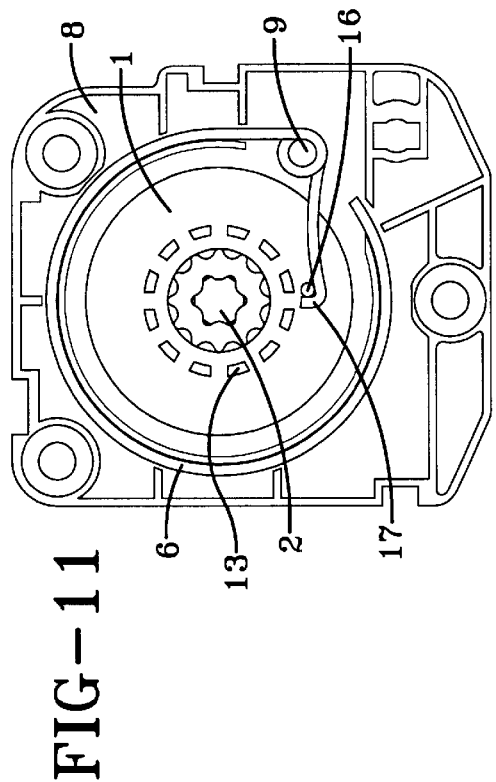
Figure 14:
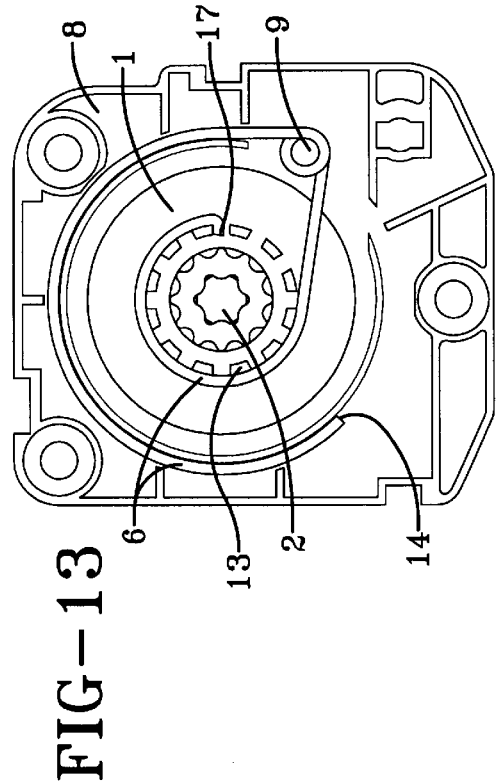

FIGS. 9 to 14 illustrate a second embodiment of the seat belt retractor according to the present invention. In this embodiment the spring 6 is held away from engagement with the spool by a release pin 16 spacing the end 17 of the wire 6 from the spool end and preventing it from engaging the cut-outs in raised ring 13. The release pin 16 is shown in FIG. 11 and bent end 17 of the wire 6 is distanced from the raised ring 13. In FIG. 12 the release pin 16 is retracted, or sheared or otherwise removed in response to a signal or action indicating particular conditions such as a heavier vehicle occupant. The bent end 17 engages in the nearest cut-out in ring 13 thus connecting the wire 6 to the spool 1. The spool then turns in a clockwise direction as shown in FIGS. 13 and 14, drawing the wire around the ring 13 by approximately three quarters of a turn. In FIG. 14 the wire 6 has been pulled almost totally onto the ring 13 and has disengaged from the peg 9. At this point the load on the vehicle occupant drops which is ideally the point at which the vehicle occupant encounters an airbag.

Figure 15:
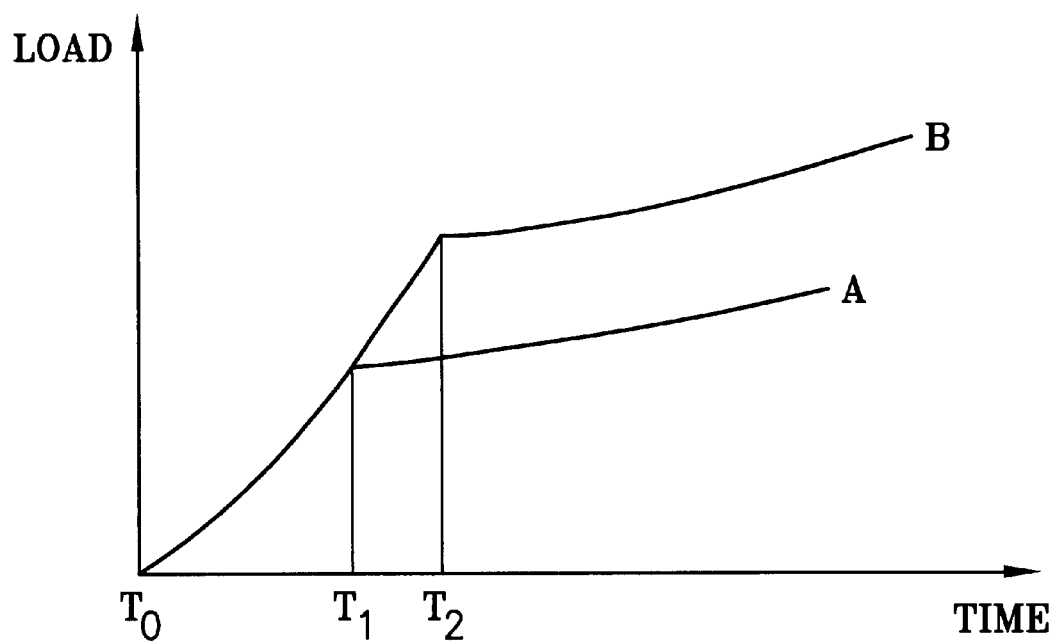
FIG. 15 is a graph illustrating how load changes overtime in a crash, for both a known seat belt retractor and a seat belt retractor according to the present invention.

FIG. 15 is a graph that illustrates the effect of the secondary mechanism. This is a graph plotting crash forces as felt by the vehicle occupant versus time. It can be seen that the force increases steadily from $T_0$ to $T_1$ at which point a threshold is reach at which the torsion bar starts to twist (see line A). Force is then absorbed by the torsion bar so that line A levels out indicating that the same felt by the vehicle occupant stays generally consistent. This is suitable for a light to average vehicle occupant. Using both the torsion bar and the secondary mechanism raises the threshold and means that the crash forces do not start to be absorbed by the load limiter until al later time $T_2$ as shown by line B. This is more suitable for a heavy vehicle occupant, who is more likely to be resilient to the higher crash forces and should be restrained for longer because otherwise their higher momentum may cause the vehicle occupant to impact with internal parts of the car during the load limiting phase.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A seat belt retractor comprising:
   a spool mounted for rotation on a retractor frame for retraction or pay-out of seat belt webbing depending upon the direction of rotation of the spool;
   a means for locking the spool against rotation when a crash is sensed;
   a force limiting means for allowing further pay-out of the seat belt webbing after the spool shaft has locked, under the influence of a vehicle occupant's forward momentum, wherein the force limiting means comprises:
   (a) a torsion bar attached in the force path between the spool and its axis of rotation;
   (b) a resilient mechanism comprising a wire that is a spring clip selectively connectable to the torsion bar, and means for selectively connecting the resilient mechanism into the force path between the spool and its axis of rotation; and
   (c) a means for selectively activating the connecting means under control of a control signal.

2. The seat belt retractor according to claim 1 wherein the torsion bar has an end connected to a locking ring which is fixed against rotation during load limiting and another end that is connected to the spool body which is adapted to rotate to twist the torsion bar when the load exceeds a predetermined value.

3. The seat belt retractor according to claim 1 wherein the torsion bar has an end connected to a locking ring which is fixed against rotation during load limiting and another end that is connected to the spool body which is adapted to rotate to twist the torsion bar when the load exceeds a predetermined value.

4. The seat belt retractor according to claim 2 wherein the resilient mechanism comprises a coiled wire connected to the spool at the end fixed to the torsion bar.

5. The seat belt retractor according to claim 2 wherein a coiled wire is connected to the spool at the end fixed to the torsion bar.

6. The seat belt retractor according to claim 1 wherein the means for selectively activating the resilient mechanism comprises a solenoid.

7. The seat belt retractor according to claim 1 wherein the means for selectively activating the resilient mechanism comprises a pyrotechnic device.

8. A seat belt retractor comprising:
   a spool mounted for rotation on a retractor frame for retraction or pay-out of seat belt webbing depending upon the direction of rotation of the spool;

a means for locking the spool against rotation when a crash is sensed;

a force limiting means for allowing further pay-out of the seat belt webbing after the spool shaft has locked, under the influence of a vehicle occupant's forward momentum, wherein the force limiting means comprises:
  (a) a torsion bar attached in the force oath between the spool and its axis of rotation;
  (b) a resilient mechanism comprising a wire that is a spring clip selectively connectable to the torsion bar, and means for selectively connecting the resilient mechanism into the force path between the spool and its axis of rotation; and
  (c) a means for selectively activating the connecting means under control of a control signal, wherein the torsion bar has an end connected to a locking ring which is fixed against rotation during load limiting and another end that is connected to a spool body which is adapted to rotate to twist the torsion bar when the load exceeds a predetermined value.

9. The seat belt retractor according to claim 8 wherein the means for selectively activating the resilient mechanism comprises a solenoid.

10. The seat belt retractor according to claim 8 wherein the means for selectively activating the resilient mechanism comprises a pyrotechnic device.

11. A seat belt retractor comprising:

a spool mounted for rotation on a retractor frame for retraction or pay-out of seat belt webbing depending upon the direction of rotation of the spool;

a means for locking the spool against rotation when a crash is sensed;

a force limiting means for allowing further pay-out of the seat belt webbing after the spool shaft has locked, under the influence of a vehicle occupant's forward momentum, wherein the force limiting means comprises:
  (a) a torsion bar attached in the force path between the spool and its axis of rotation, the torsion bar having an end connected to a locking ring that is fixed against rotation during load limiting and another end that is connected to the spool body which is adapted to rotate to twist the torsion bar when the torsion bar is subjected to a load that exceeds a predetermined value;
  (b) a resilient mechanism comprising a coiled wire connected to the spool at the end fixed to the torsion bar and connected to a bias spring tending to keep the webbing wound on the spool, and means for selectively connecting the resilient mechanism into the force path between the spool and its axis of rotation; and
  (c) a means for selectively activating the connecting means under control of a control signal.

12. The seat belt retractor according to claim 11 wherein the means for selectively activating the resilient mechanism comprises a solenoid.

13. The seat belt retractor according to claim 11 wherein the means for selectively activating the resilient mechanism comprises a pyrotechnic device.

14. A seat belt retractor comprising:

a spool mounted for rotation on a retractor frame for retraction or pay-out of seat belt webbing depending upon the direction of rotation of the spool;

a means for locking the spool against rotation when a crash is sensed;

a force limiting means for allowing further pay-out of the seat belt webbing after the spool shaft has locked, under the influence of a vehicle occupant's forward momentum, wherein the force limiting means comprises:
  (a) a torsion bar attached in the force path between the spool and its axis of rotation, the torsion bar having an end connected to a locking ring which is fixed against rotation during load limiting and another end that is connected to the spool body which is adapted to rotate to twist the torsion bar when the load exceeds a predetermined value;
  (b) a resilient mechanism comprising a coiled wire connected is to the spool at the end fixed to the torsion bar that is connected to a bias spring tending to keep the webbing wound on the spool, and means for selectively connecting the resilient mechanism into the force path between the spool and its axis of rotation; and
  (c) a means for selectively activating the connecting means under control of a control signal.

15. The seat belt retractor according to claim 14 wherein the means for selectively activating the resilient mechanism comprises a solenoid.

16. The seat belt retractor according to claim 14 wherein the means for selectively activating the resilient mechanism comprises a pyrotechnic device.

* * * * *